May 7, 1963  W. H. J. D. DAALDEROP  3,088,358
TOOL SUPPORT ABSORBING TOOL REACTIONARY FORCE
Filed Dec. 19, 1958  6 Sheets-Sheet 1
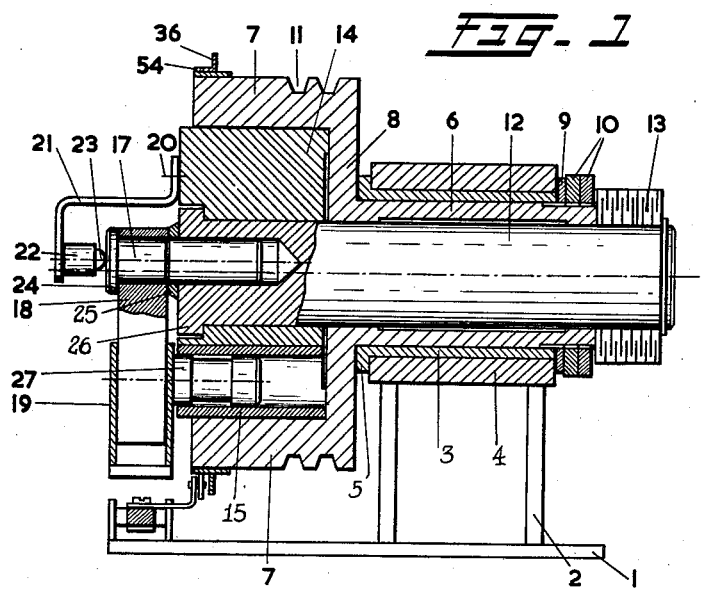
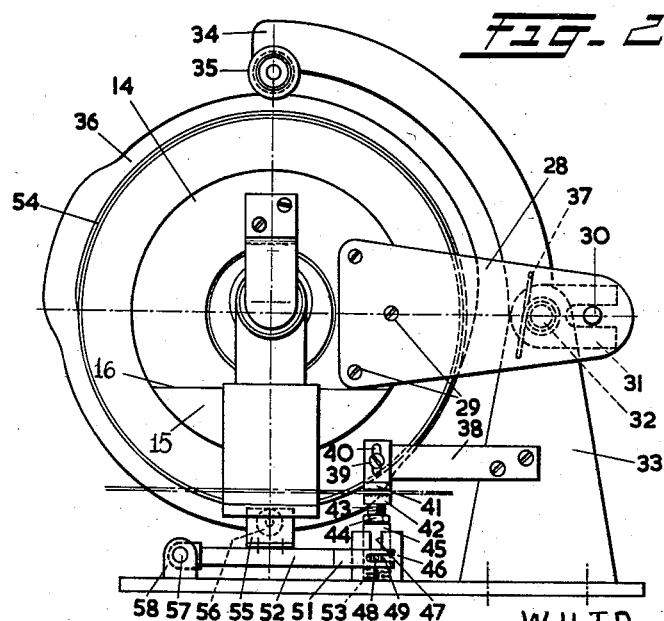
W.H.J.D. DAALDEROP,
INVENTOR:
BY:
Wenderoth, Lind & Ponack
ATTORNEYS

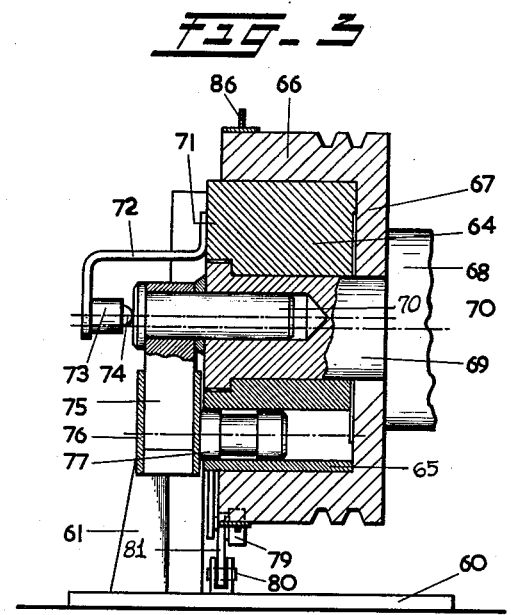
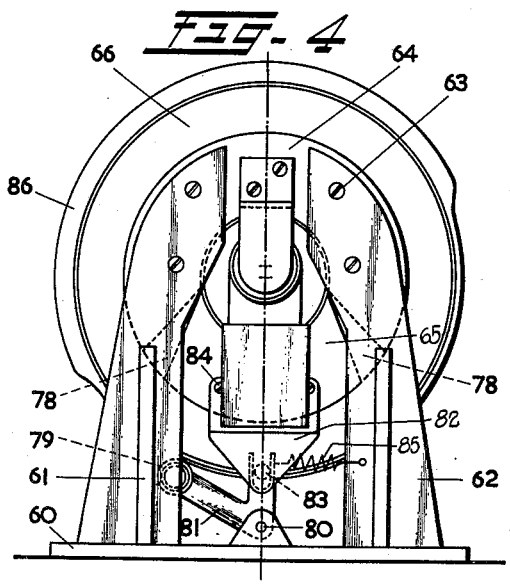
W.H.J.D. DAALDEROP
INVENTOR

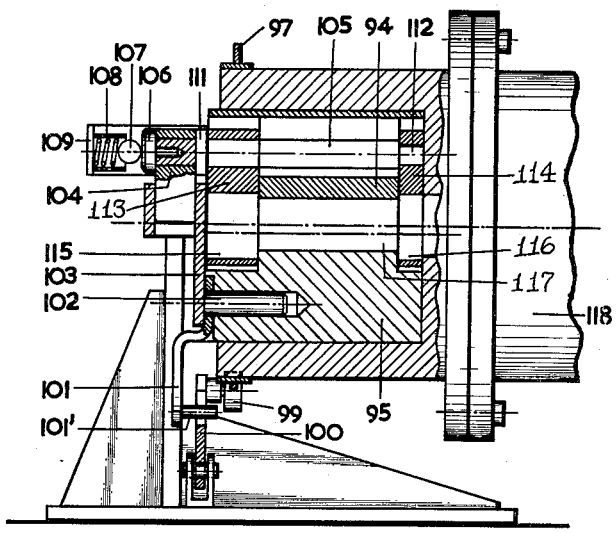
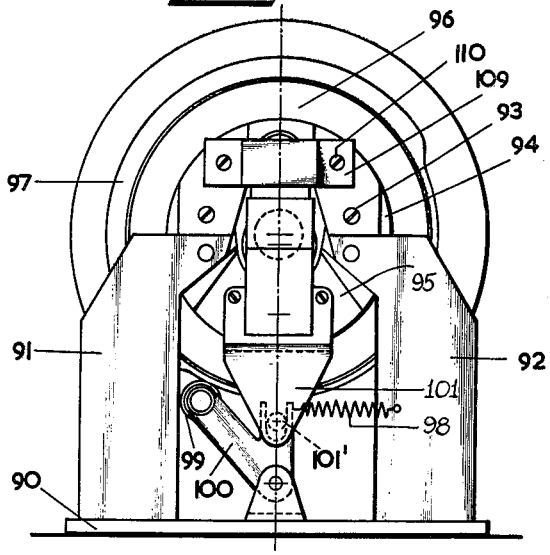
W.H.J.D. DAALDEROP
INVENTOR

May 7, 1963 W. H. J. D. DAALDEROP 3,088,358
TOOL SUPPORT ABSORBING TOOL REACTIONARY FORCE
Filed Dec. 19, 1958 6 Sheets-Sheet 4
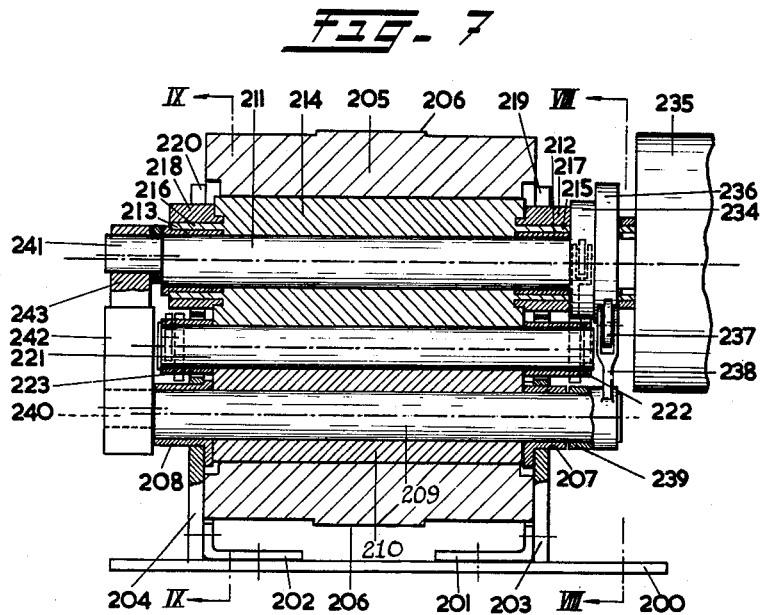
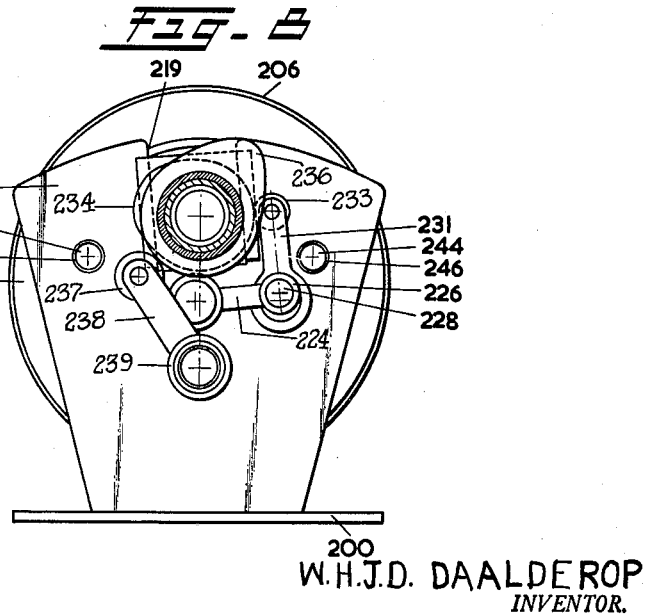
W. H. J. D. DAALDEROP
INVENTOR.
BY Wenderoth, Lind & Ponack
ATTORNEYS May 7, 1963 W. H. J. D. DAALDEROP 3,088,358
TOOL SUPPORT ABSORBING TOOL REACTIONARY FORCE
Filed Dec. 19, 1958 6 Sheets-Sheet 5

W. H. J. D. DAALDEROP
INVENTOR

BY:
Wenderoth, Lind & Ponack
ATTORNEYS

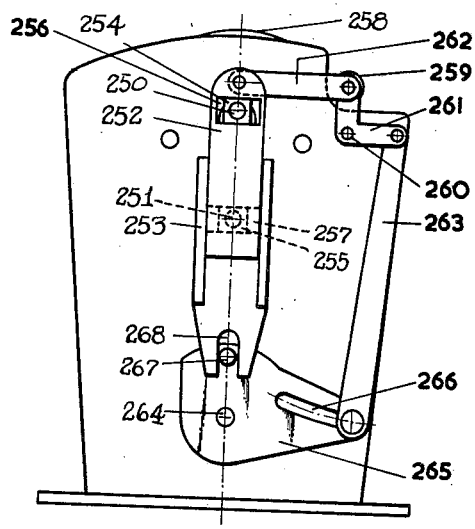

United States Patent Office 3,088,358
Patented May 7, 1963

3,088,358
TOOL SUPPORT ABSORBING TOOL REACTIONARY FORCE
Wilhelmus H. J. D. Daalderop, Tiel, Netherlands, assignor to N.V. Koninklijke Metaalwarenfabrieken v/h J. N. Daalderop & Zonen, Tiel, Netherlands, a corporation of the Netherlands
Filed Dec. 19, 1958, Ser. No. 781,639
Claims priority, application Netherlands Dec. 20, 1957
12 Claims. (Cl. 83—317)

The present invention relates to an eccentric press and has for its object to so arrange said press that periodically a lateral movement may be imparted to a pair of tools mutually guiding each other, which lateral movement has a component reciprocating in the direction of the strip feed and which may be so coordinated with said strip feed that as compared with conventional feeding systems the strip feed may take place with slighter accelerations and decelerations, which especially in the case of high speed presses is of importance for preventing inaccuracies and difficulties in the strip feed.

Another object of the invention is to transfer the reaction forces of the tools during the operative stroke of a press to one of the rotating parts of the driving mechanism, in which part said forces will eliminate each other, so that said forces are not transferred via the frame of the press. As a result the construction of the frame may be very light.

More particularly the invention has for its object to so construct a press that the objects mentioned hereinbefore are as much as possible achieved by the same means.

Said means according to the invention that are further defined in the claims will be elucidated with reference to the accompanying drawings showing some embodiments of the press.

In said drawings, which are schematic:

FIGURE 1 is a vertical axial sectional view of a first embodiment of a press according to the invention;

FIGURE 2 is an elevational view of said press;

FIGURE 3 is a vertical axial sectional view of a second embodiment of the press according to the invention;

FIGURE 4 is an elevational view of the press according to FIGURE 3;

FIGURE 5 is a vertical axial sectional view of a third embodiment;

FIGURE 6 is an elevational view of the press according to FIGURE 5;

FIGURE 7 is a vertical axial sectional view of a fourth embodiment of a press according to the invention;

Figure 9:
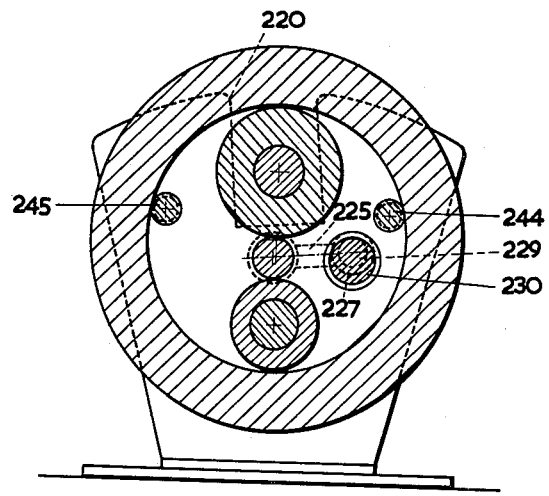
Figure 10:
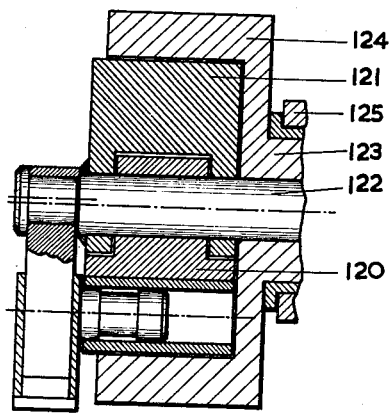

FIGURE 8 and FIGURE 9 respectively are cross-sectional views of said embodiment taken on the lines VIII—VIII and IX—IX respectively in FIGURE 7;

FIGURE 10 is a vertical axial sectional view of some parts of the press according to a fifth embodiment;

FIGURE 11 is an elevational view of a sixth embodiment.

The machine according to FIGURES 1 and 2 bears on a frame, comprising a base plate 1 and an upright 2 on which a bearing casing 3 is rigidly secured e.g. by welding it to said upright. A bearing sleeve 4 is provided within the bearing casing in closely fitting relationship therewith and is secured from rotation relative to said bearing casing by elements not shown, while movement of the sleeve 4 in axial direction is prevented by the shoulder 5 on said sleeve.

The hollow shaft 6 is mounted for rotation in the bearing sleeve 4, said hollow shaft being formed integral with the flywheel 7 via the disc shaped part 8. The position of the flywheel 7 in axial direction is determined on the one hand by the set of nuts 10 screwed onto the hollow shaft 6, which set of nuts bears against the bearing casing 3 via the annular disc 9 and on the other hand by the disc shaped part 8 bearing against the shoulder 5 of the bearing sleeve 4. The flywheel 7 is provided with a V-shaped groove 11 which is to accommodate the belt of a belt drive.

The central shaft 12 is mounted for rotation in the hollow shaft 6, said central shaft 12 being adapted to be coupled with the hollow shaft 6 by means of the electro-magnetic coupling 13.

In the flywheel 7 two disc-segments 14 and 15 are provided which together form a complete disc consisting of two parts thart are separated according to the line 16, said disc being so fitted in the flywheel 7 as to be relatively rotatable.

A removable pin 17 is eccentrically inserted in the central shaft 12, said pin 17 carrying the punch 18 of a punch and die 18, 19 that guide each other mutually. A strap 21 bent at right angles is secured to the segment 14 by means of screws 20, said strap carrying a sleeve 22 at its one end, which sleeve contains a spring which urges a ball 23 against the front end of the pin 17, so that said pin with its shoulder 24 urges the punch 18 against a spacing disc 25 bearing against the front face of the central shaft 12. The shaft 12 has a shoulder 26 by means of which the segments 14, 15 are secured from axial movement in the flywheel 7 and at the same time said shoulder 26 in cooperation with the electro-magnetic coupling 13 keeps the shaft 12 itself in its place in axial direction.

The die 19 of the punch and die assembly is secured to a pin 27 which is mounted for rotation in the lower disc segment 15, the axial position of the die 19 being determined by the punch 18 which is guided in said die.

The segments 14, 15 are prevented from rotating along with the flywheel 7 by means of the plate 28 which is secured to the segment 14 by means of the screws 29 and which has a pin 30 mounted thereon, which pin engages in the bifurcate end 31 of the two armed lever which at 32 is pivoted to a supporting plate 33 mounted on the base plate 1. The other end 34 of said lever carries a follower roller 35 which is biassed by the spring 37 against a cam ring 36 mounted on the circumference of the flywheel 7. If desired the lever 31, 34 may be so secured from movement to the supporting plate 33 by means of an arresting device, not shown, that the roller 35 remains clear of the cam ring 36, so that the flywheel 7 can rotate while for the rest the press is inoperative.

Furthermore a bracket 38 is secured to the supporting plate 33 e.g. by means of screws, at the end of which bracket the counter-part 41 of a strip arresting device can be secured by means of the screw bolt 39 engaging in an adjusting slot 40 of said counter-part 41. The movable part 42 of said arresting device has a screw pin 43 at its lower side, which screw pin can be adjusted and be secured by means of a nut 44 in a screw-threaded sleeve 45 which is guided in a bush 46 fixed to the base plate 1. The screw-threaded sleeve 45 is provided with a pair of pins 48 extending forwardly and rearwardly through slots 47 in the bush 46, which pins extend into slots 49 of the bifurcate ends 51 of the lever 52 engaging about the guiding bush 46, so that said lever is adapted to control the movable part 42 of the arresting device. The upwardly directed movement of said part 42 is caused by the spring 53 while its downward movement is derived from the cam segment 54 provided on the circumference of the flywheel 7, which cam segment acts on the roller 56 which by means of the angle iron 55 is secured to the lever 52. By means of a transverse shaft 57 the lever 52 is pivotally secured in supporting members 58 mounted on the base plate 1. In FIGURE 2 the strip to be treated is indicated by a dash-dot line and by a dash-dash-dot line when passing through the die 19.

The operation of the press according to FIGURES 1 and 2 is as follows.

The flywheel 7 is adapted to be driven by a belt accommodated in the groove 11. When the electro-magnetic coupling 13 is energized the central shaft 12 is coupled to the flywheel and as a result the eccentric pin 17 will describe a circular path, which movement is followed by the upper portion of the punch 18, so that said punch 18 will move up and down in the die 19 and together with said die 19 will perform an oscillating movement about the axis of the pin 27. During the up and downward movement of the punch 18 in the die 19 the strip fed through parts 41 and 42 of the arresting device into the die is punched.

The reacting forces acting on the punch and die 18, 19 are directly transferred to the inner circumference of the flywheel 7 by the segments 14 and 15 respectively, so that said forces are not transferred to parts of the frame. In consequence there is no longer any possibility of the frame being distorted by said forces which would interfere with the correct cooperation between the punch and the die and which would result in the punch and die being damaged, another advantage being that the construction of the frame may be light and cheap.

Another particularity is that the oscillating movement of the punch and die assembly 18, 19 about the pin 27 may be coordinated with the feed of the strip to be punched. As a result the punching operation by the punch and die assembly 18, 19 may take place as the strip is moving and as the lower end of the punch and die assembly moves along in the same direction. This eliminates the necessity of completely bringing the strip to a standstill during each stroke as is required in a conventional press, so that the number of strokes of the press per minute can be raised to a considerable extent without the feeding of the strip giving rise to difficulties. It stands to reason that the results that are achievable in this manner also depend on the distance over which the strip should be moved per stroke, which distance will be different in dependence on the type of parts to be punched out of the strip. Now in order to enable the punch and die assembly to move along with the strip to a greater extent the cam ring 36 is provided, which with its cams will cause the follower roller 35 and consequently the lever 31, 34 to move at the right moment, so that when said lever pivots about the pivot 32 the pin 30 secured to the plate 28 is moved by the bifurcate end 31 of said lever. As a result an additional rotary movement about the central axis is imparted to the segment 14 and in consequence also to the segment 15 which rotary movement, if correctly coordinated with the oscillating movement of the punch and die assembly, considerably increases the possibility of raising the rate of operation of the press.

Dependent on the length of feed of the strip it may be necessary to fully arrest said strip or to slow it down at a given moment. This is effected by the parts 41, 42 of the arresting device through which the strip passes. The cam 54 on the flywheel 7 causes the roller 56 and as a result the lever 52 to move downwardly so that the arresting device 41, 42 is opened. In dependence on the configuration of the cam segment 54 the spring 53 will cause the part 42 to move upwardly and as a result to exert a braking or arresting action on the strip in conjunction with the part 41. In most cases this additional arrangement will not be necessary or will be kept inoperative. For the rest it will be clear that strip control means of a different type may derive their movement from cam means provided on the flywheel. As such auxiliary devices do not further elucidate the essentials of the invention they will be further left out of account.

The press according to FIGURES 3 and 4 is based on the same principles as the press according to FIGURES 1 and 2. The difference mainly resides in the construction of the segments and the manner of securing the press to the frame.

The frame comprises a base plate 60 and uprights 61, 62 mounted thereon. To said uprights the uppermost segment 64 of the segments 64, 65 provided in the flywheel 66 is secured by means of screws 63, so that the remainder of the entire mechanism is supported by the segment 64. The disc-shaped portion 67 of the flywheel 66 is coupled with the one portion of the electro-magnetic coupling 68, the other portion of which is connected with the central shaft 69 located between the segments 64, 65 and in which shaft an eccentric pin 70 is inserted again, which eccentric pin 70 is kept in its place in axial sense by means of the strap 72 secured to the segment 64 with screws 71 and by means of the spring biassed ball 74 provided in the sleeve 73 carried by said strap 72.

The punch 75 of the punch and die assembly 75, 76 is adapted to pivot about the pin 70 and is guided in the die 76 which by means of the pin 77 is mounted for oscillating movement in the lower segment 65.

Upon coupling the rotating flywheel 66 with the shaft 69 the pin 70 will describe a circular path, the punch 75 and the die 76 performing an operative stroke relative to each other and the punch and die assembly 75, 76 swinging about the axis of the pin 77, which movement is again coordinated with the feed of the strip. Now in order also to impart an additional oscillating movement to the tool assembly, open sectors 78 are left between the segments 64, 65, so that the segment 65 is adapted to oscillate relative to the stationary segment 64. Said additional oscillatory movement is controlled by the cam ring 86 on the flywheel 66 via the roller 79, the double armed lever 81 pivoted at 80, the coupling pin 83 engaging in the bifurcate end of said lever and the plate 82 carrying said pin 83, which plate is secured on the segment 65 by means of screws 84, said cam ring acting in cooperation with the spring 85 fixed to the upright 62 and the lever 81.

In the embodiment according to FIGURES 5 and 6 the upper segment 94—in accordance with the embodiment according to FIGURES 3 and 4—is secured by means of screws 93 to the uprights 91, 92, which together with the base plate 90 form the frame, which upper segment again mainly carries the entire mechanism. Free sectors are again provided between the segments 94, 95, while the flywheel 96 rotatable about the segments 94, 95 carries a cam ring 97 which in conjunction with the springs 98 controls the oscillatory movement of the segment 95 via the roller 99, the lever 100 and the plate 101 provided with the pin 101', which parts are secured and cooperate in the same manner as the corresponding parts of the embodiment according to FIGURES 3 and 4.

The die 103 is secured to a pin 102 inserted in the lower segment 95 so that said die 103 is adapted to oscillate, while the punch 104 guided in the die is mounted for oscillating movement on the pin 105, which by means of the bearing disc 106, the ball 107, the spring 108 and the strap 109 which latter is secured to the upper segment 94 by means of screws 110, is secured from movement in axial direction.

Behind its shoulder 111 and with its thinner end 112 the pin 105 rests in connecting rods 113 and 114 respectively which fit about eccentric shoulders 115 and 116 respectively of the central shaft 117, which is located between the segments 94, 95 and is connected with the one part of the electro-magnetic coupling 118, the other part of which coupling is connected with the flywheel 96 rotatable about the segments 94, 95. The pin 105 is guided directly or by means of the appropriately formed upper ends of the connecting rods 113 and 114 in the recess in the segment 94, which recess accommodates the pin 105 and the connecting rods 113, 114, said guiding being such that the pin 105 can only perform a vertical reciprocating movement upon the energisation of the coupling 118 and upon the consequent rotation of the eccentric shoulders 115, 116, the eccentricity of which has the same direction. As a result the punch 104 is driven rectilinearly when the press operates and therefore the punch and die assembly 103, 104 does not oscillate. The oscillatory movement to be coordinated with the strip feed is only obtained in this embodiment by the movement of the segment 95 which movement is derived from the cam ring 97.

The press according to FIGURES 7–9 bears on a base plate 200 via vertical supporting plates 203, 204 secured thereto by means of angle irons 201, 202.

The press is provided with a flywheel 205 adapted to be driven by a flat belt passed about its central portion 206. The flywheel 205 bears with its inner circumference on a plurality of rollers which are rotatably supported in the supporting plates 203, 204 and are frictionally driven by the flywheel either directly or indirectly.

The lowermost of said rollers is composed of a shaft 209 supported in the supporting plates by means of bearing bushes 207, 208, about which shaft 209 a hollow supporting cylinder 210 located between the supporting plates is rotatable. The uppermost supporting roller is composed of a shaft 211 which by means of bearing bushes 212 and 213 is rotatably supported in the supporting cylinder 214 which is mounted for rotation in bearing blocks 217 and 218 accommodating the ends 215, 216 of said cylinder which ends are of reduced diameter. The cylinders 210, 214 form the main supporting rollers for the flywheel.

The bearing blocks 217, 218 have a rectangular outer circumference provided with circumferential slots with which they are vertically slidable in rectangular recesses 219 and 220 respectively of the supporting plates 203 and 204 respectively. The supporting cylinder 214 on which the flywheel 205 bears directly, rests on the supporting cylinder 210 via the shaft 221.

The shaft 221 has its ends inserted in bearing bushes 222 and 223 respectively which bushes are provided with arms 224 and 225 respectively, which arms have their other ends firmly secured to bushes 226, 227 provided on the eccentric ends 228 and 229 respectively of the shaft 230. The shaft 230 is supported in the supporting plates 203, 204, while its position in a rotative sense is determined by the arm 231 secured to said shaft, which arm 231 via a follower roller 233 is controlled by the cam disc 234. When the cam on said cam disc is out of contact with the roller 233 the axis of the shaft 221 is outside the plane containing the axes of the shafts 211 and 209. If the cam of the cam disc 234 urges the roller 233 to the right, as seen in the cross-sectional view, the arms 224, 225 owing to the rotation of the shaft 230 and the eccentric ends 228, 229 thereof will draw the shaft 221 farther between the supporting cylinders 210 and 214 so that said supporting cylinders 210 and 214 are urged with greater force against the inner circumference of the flywheel 205, so that larger forces can be transmitted by the increased friction.

The end 215 of the supporting cylinder 214 and the corresponding end of the shaft 211 extend into the electromagnetic coupling 235 which may be of a known type and which, therefore, has not been shown in detail. The innermost portion of said coupling is directly connected with the end 215 of the cylinder, the outermost portion of said coupling is directly connected with the shaft 211. This outermost portion has a hub fitting about the cylinder end 215 in freely rotatable relationship therewith, which hub carries the above mentioned cam disc 234 and a cam disc 236 which latter disc is adapted to impart to the shaft 209 an angular displacement about it axis via the roller 237 and the arm 238 which with its annular end 239 is secured to one end of the shaft 209. Springs, not shown, act on the arms that are controlled by the cam discs 234 and 236 which springs serve to keep the follower rollers in contact with the cam discs.

The shafts 209 and 211 are each provided at one end with an eccentric pin 240 and 241 respectively, on which pins the die and punch 242 and 243 respectively that mutually guide each other, are provided. The means for retaining said punch and die in axial sense has not been shown in the drawing.

In order to sufficiently guide the flywheel 205 in horizontal direction it has shafts 244, 245 arranged against its inner circumference, which shafts are mounted for rotation in the supporting plates 203, 204 by means of bearing bushes 246 and 247 respectively.

The operation of the press according to this embodiment is as follows.

The flywheel 205 is continuously driven, so that at the same time the cylinders 214 and 210 and the shaft 221 rotate. Upon energization of the coupling 235 also the shaft 211 is rotated and so are the cam discs 234 and 236. The shaft 211 moves its eccentric pin 241 in a circular path so that punch 243 performs an operative stroke relative to the die 242 during its revolution. The punch and die assembly 243, 242 at the same time performs an oscillatory movement about the eccentric pin 240 of the shaft 209. On said oscillatory movement an additional oscillatory movement about the eccentric pin 241 is superposed by the rotation of the eccentric pin 240 about the axis of the shaft 209 owing to the rotation imparted to said shaft by the cam disc 236 via the roller 237 and the arm 238. The selection of the eccentricities and of the cam disc determines the desired coordination of the punch and die movement with the strip feed.

Owing to the force to be supplied by the flywheel to the punch and die assembly said flywheel undergoes a reaction which will bias said flywheel in transverse direction so that said flywheel will commence exerting a greater clamping force on the sets of supporting rollers. Said increased clamping force is enhanced because the cam disc 234 via the roller 233, the arm 231, the shaft 230 and the eccentric ends 228 and 229 respectively of said shaft and finally via the arms 224 and 225 respectively at the right moment vigorously pulls the shaft 221 between the cylinders 210, 214.

Variations in respect of the described embodiment based on supporting rollers are possible within the scope of the invention e.g. by replacing the frictional transmission by a gear transmission.

In respect of the embodiments comprising a supporting disc or supporting disc segments variations within the scope of the invention are likewise possible.

As an example of such a variation FIGURE 10 shows some elements of an embodiment in which the segments 120 and 121 separated by free sectors are solely supported on the central shaft 122 on which they directly transfer the reaction forces of the tool assembly. The shaft 122 is supported in the hub 123 of the flywheel 124, which hub is mounted for rotation in the bush 125 connected to the frame. As a variant thereof it is also possible here to have the flywheel directly supported by the segments as is the case in the embodiment according to FIGURES 3, 4.

Furthermore an additional oscillation can be imparted to each of the segments separately by means of cam elements. If segments that are relatively oscillatable are not employed, it is possible to use a single segment or a full, undivided supporting disc e.g. by omitting the separating face 16 in FIGURE 2.

In conclusion FIGURE 11 diagrammatically shows a method of controlling the lateral movement of the punch and die assembly entirely independently of the movement of the operative stroke, so that a still greater adaptation to the strip feed is possible. To achieve this end the crank pins 250 and 251 respectively vertically drive the punch and die 252 and 253 respectively via sliding blocks 254 and 255 respectively which are laterally movable in slots 256 and 257 of the punch and die 252 and 253 respectively, the lateral movement of which is controlled by the cam ring 258 via the cam roller 259, the bell crank lever 261 pivoted at 260 and the coupling rod 262 as regards the punch 252 and the coupling rod 263 the rocking disc 265 pivoted at 264, which disc is provided with an adjusting slot 266, and the pin and slot connection 267, 268 as regards the die 253.

I claim:

1. An apparatus for treating a moving strip and the like, comprising a frame, rotatable drive means supported from said frame, said drive means comprising a flywheel and a shaft adapted to be coupled to said flywheel for rotation therewith, a pair of cooperating members for treating said strip guided in alignment with respect to each other and eccentric means associated with said shaft to reciprocate one of said strip treating members with respect to the other, bearing means supported by one of said rotatable drive means, said cooperating strip treating members being both supported in said bearing means with one member reciprocated by said eccentric means and the other member being mounted in said bearing means whereby the reaction forces generated between said members during a pressing operation upon said strip is absorbed by said drive means without said forces being transferred to said frame.

2. An apparatus for treating a moving strip and the like, comprising a frame, rotatable drive means supported by said frame, said drive means comprising a flywheel and a shaft adapted to be coupled to said flywheel for rotation therewith, a pair of cooperating members for treating said strip guided in alignment with respect to each other, eccentric means associated with said shaft to reciprocate one of said strip treating members with respect to the other, bearing means supported by the inner circumference of said flywheel, said cooperating strip treating members being both supported in said bearing means with one member reciprocated by said eccentric means and the other member being mounted in said bearing means whereby the reaction forces generated between said members during a pressing operation upon said strip is absorbed by said drive means without said force being transferred to said frame.

3. An apparatus as set forth in claim 2 wherein said bearing means comprise a plurality of parts and a cam and follower means being connected to one of the bearing parts for imparting an oscillatory movement to at least one of said bearing parts and thereby provide an oscillatory movement to the said aligned and guided strip treating members, through the mounting of one of said strip treating members in said bearing means, for synchronizing the movement of the strip treating members with the moving strip.

4. An apparatus as set forth in claim 2, wherein said bearing means comprises a bearing disc divided into a plurality of segments bearing on the inner circumference of said flywheel, one of said segments having a pin for oscillatory mounting of one of said members thereon, and said eccentric means comprises a crank pin upon which another segment is mounted.

5. An apparatus according to claim 4, in which said segments are spaced to provide free sectors in said bearing disc, and a cam and follower means being connected to one of said segments for imparting an oscillatory movement to at least one of said segments and thereby provide an oscillatory movement to said aligned and guided strip treating members, through the mounting of one of said strip treating members in said bearing means, for sychronizing the movement of the strip treating members with the moving strip.

6. An apparatus as set forth in claim 2, in which said flywheel is carried at its inner circumference by a set of supporting rollers comprising two main supporting rollers arranged diametrically with respect to said flywheel, shafts upon which said supporting rollers are mounted, each of said last named shafts carrying one member of said pair of members at one end, said main supporting rollers transferring the reaction forces generated between said members during a pressing operation upon said strip to the inner circumference of said flywheel.

7. An apparatus as set forth in claim 6, in which one of said main supporting rollers is coupled to the shaft upon which it is mounted and, one of said members is mounted on said last named shaft eccentric to the axis thereof.

8. An apparatus as set forth in claim 6, in which said main supporting rollers are coupled to said flywheel by friction and an intermediate roller is in engagement with said supporting rollers to be forced between said main supporting rollers to urge both said rollers into firm engagement with said flywheel.

9. An apparatus as set forth in claim 8, in which said intermediate roller is forced between said main supporting rollers during a pressing operation upon said strip by means of a cam and follower element connected to one of said members.

10. An apparatus as set forth in claim 6, in which each of said shafts associated with a main supporting roller carries a strip treating member eccentrically with respect to its axis, one of said shafts being adapted to be oscillated about its axis by a cam and follower element connected with the other of said shafts.

11. An apparatus for treating a moving strip and the like, comprising a frame, rotatable drive means supported from said frame, said drive means comprising a flywheel and a main shaft adapted to be coupled to said flywheel for rotation therewith, a pair of cooperating members for treating said strip guided in alignment with respect to each other and eccentric means associated with said main shaft to reciprocate one of said strip treating members with respect to the other, said drive means completely supporting both said strip treating members and at least one of them via an intermediate bearing means, the reaction forces generated between said cooperating members during a pressing operation being absorbed by said drive means without being transferred to said frame of the press, a sliding block movable in a slot in one of said strip treating members and coupling said one strip treating member with its associated eccentric means, said block being movable relative to said strip treating member transversely to the direction of the operative stroke and means for moving the sliding block to control the movement of said strip treating member laterally for synchronizing the strip treating member movement with the moving strip.

12. An apparatus for treating a moving strip and the like, comprising a frame, rotatable drive means supported from said frame, said drive means comprising a flywheel and a main shaft adapted to be coupled to said flywheel for rotation therewith, a pair of cooperating members for treating said strip guided in alignment with respect to each other and eccentric means associated with said main shaft to reciprocate one of said strip treating members with respect to the other, said drive means completely supporting both said strip treating members and at least one of them via an intermediate bearing means, the reaction forces generated between said strip treating members during a pressing operation being absorbed by said drive means without being transferred to said frame of the press, each of said pair of strip treating members being supported by said drive means via sliding blocks mounted for movement in slots in said strip treating members, said sliding blocks being relatively movable to its associated strip treating member transversely to the direction of the operative stroke and means for moving the sliding blocks to control the movement of said strip treating members laterally for synchronizing the movement of the strip treating members with the moving strip.

References Cited in the file of this patent

UNITED STATES PATENTS

| | | |
|---|---|---|
| 130,371 | Hendryx | Aug. 13, 1872 |
| 1,378,414 | Indahl | May 17, 1921 |
| 2,501,631 | Oschwald | Mar. 3, 1950 |
| 2,867,070 | McCall et al. | Jan. 6, 1959 |
| 2,873,803 | Sarka | Feb. 17, 1959 |